(12) United States Patent
Duong et al.

(10) Patent No.: US 11,143,201 B2
(45) Date of Patent: Oct. 12, 2021

(54) IMPELLER TIP CAVITY

(71) Applicant: PRATT & WHITNEY CANADA CORP., Longueuil (CA)

(72) Inventors: Hien Duong, Mississauga (CA); Jason Nichols, Mississauga (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 130 days.

(21) Appl. No.: 16/354,292

(22) Filed: Mar. 15, 2019

(65) Prior Publication Data

US 2020/0291959 A1   Sep. 17, 2020

(51) Int. Cl.
*F04D 29/44* (2006.01)

(52) U.S. Cl.
CPC .................. *F04D 29/441* (2013.01)

(58) Field of Classification Search
CPC ..... F04D 29/441; F04D 29/44; F04D 29/4246
See application file for complete search history.

(56) References Cited

U.S. PATENT DOCUMENTS

| | | | | |
|---|---|---|---|---|
| 2,453,524 | A * | 11/1948 | McMahan | F04D 29/444 415/208.4 |
| 3,804,547 | A * | 4/1974 | Hagemann | F04D 5/002 415/55.2 |
| 4,131,389 | A * | 12/1978 | Perrone | F04D 29/444 415/208.3 |
| 4,164,845 | A * | 8/1979 | Exley | F01D 9/045 415/207 |
| 4,445,816 | A * | 5/1984 | Ribaud | F04D 29/444 415/181 |
| 5,516,263 | A * | 5/1996 | Nishida | F04D 29/444 415/208.2 |
| 7,326,027 | B1 | 2/2008 | Skoch et al. | |
| 7,648,331 | B2 * | 1/2010 | Spakovszky | F04D 29/684 415/1 |

(Continued)

FOREIGN PATENT DOCUMENTS

| EP | 1881181 | 1/2008 |
|---|---|---|
| EP | 2169237 | 3/2010 |

(Continued)

OTHER PUBLICATIONS

European Search report dated Jul. 30, 2020 for application No. 20163432.6.

*Primary Examiner* — Igor Kershteyn
*Assistant Examiner* — Joshua R Beebe
(74) *Attorney, Agent, or Firm* — Norton Rose Fulbright Canada LLP

(57) ABSTRACT

A gas turbine engine for an aircraft having a centrifugal compressor including an impeller with impeller blades extending from a hub, the impeller mounted for rotation about a central longitudinal axis within an outer shroud. A main flow passage wall is located on a shroud side near the impeller exit, the main flow passage wall separating a cavity disposed on the shroud side from the main flow passage. One or more apertures are defined through the main flow passage wall and extending along a respective aperture axis between the cavity and the main flow passage. The apertures have a main flow passage side opening located radially outward from the impeller exit. The aperture axis is disposed at a radial angle relative to the central longitudinal axis.

21 Claims, 4 Drawing Sheets

(56) References Cited

U.S. PATENT DOCUMENTS

| | | |
|---|---|---|
| 8,021,104 B2 | 9/2011 | Gu et al. |
| 8,087,249 B2 | 1/2012 | Ottaviano et al. |
| 8,147,178 B2 | 4/2012 | Ottaviano et al. |
| 8,287,233 B2 | 10/2012 | Chen |
| 9,234,526 B2 | 1/2016 | Zheng et al. |
| 9,644,639 B2 * | 5/2017 | Duong .................. F04D 23/008 |
| 9,726,084 B2 | 8/2017 | Duong et al. |
| 2008/0056892 A1 | 3/2008 | Barton et al. |
| 2010/0077768 A1 | 4/2010 | Leblanc |
| 2012/0186605 A1 | 7/2012 | Nakaniwa |
| 2013/0051974 A1 * | 2/2013 | Poon .................. F04D 29/4206 415/1 |
| 2014/0369823 A1 | 12/2014 | Yamashita |
| 2015/0226232 A1 | 8/2015 | Duong |
| 2015/0275917 A1 | 10/2015 | Fukuyama |
| 2016/0186601 A1 | 6/2016 | Manning et al. |
| 2017/0198713 A1 * | 7/2017 | Bessho .................. F02B 39/00 |
| 2017/0211595 A1 | 7/2017 | Bertoneri et al. |
| 2017/0248155 A1 | 8/2017 | Parker et al. |
| 2017/0260998 A1 | 9/2017 | Masutani et al. |
| 2017/0284401 A1 * | 10/2017 | Kreienkamp ......... F04D 29/681 |
| 2018/0080456 A1 | 3/2018 | Masutani et al. |
| 2018/0100514 A1 | 4/2018 | Venkataraman et al. |
| 2018/0347589 A1 | 12/2018 | Yanagisawa et al. |
| 2019/0128270 A1 | 5/2019 | Pelton et al. |
| 2019/0226488 A1 | 7/2019 | Tawfik et al. |
| 2019/0285072 A1 | 9/2019 | Masutani et al. |
| 2020/0049158 A1 | 2/2020 | Brogelli |
| 2020/0291959 A1 | 9/2020 | Duong et al. |

FOREIGN PATENT DOCUMENTS

| | | |
|---|---|---|
| EP | 2905477 | 8/2015 |
| GB | 1132485 | 11/1968 |

* cited by examiner

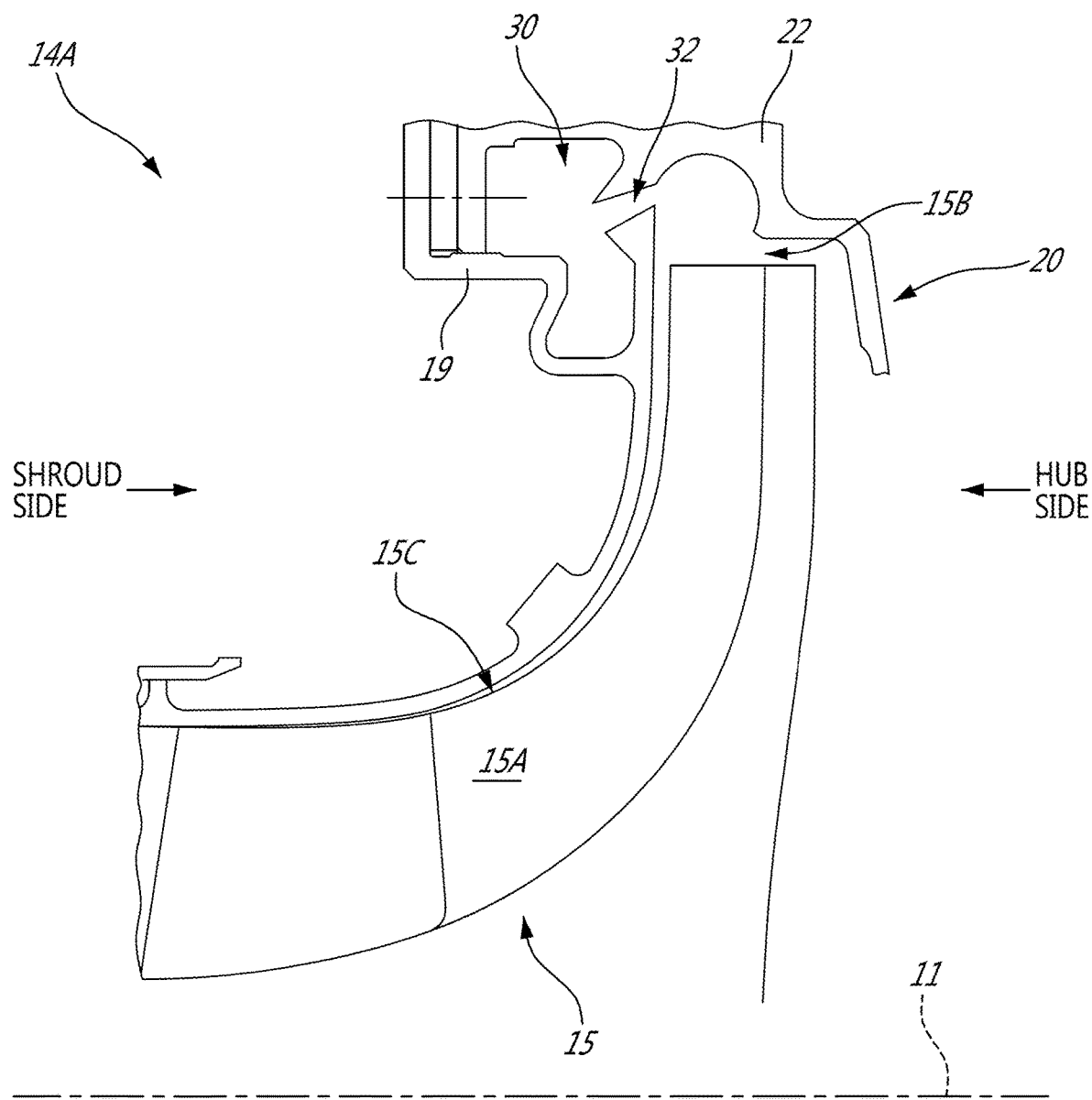

IMPELLER TIP CAVITY

TECHNICAL FIELD

The present invention relates generally to centrifugal compressors, and more particularly to impellers with diffusers.

BACKGROUND

Centrifugal compressors include an impeller and a diffuser downstream therefrom. Pressure at impeller exit may vary circumferentially due to pressure difference between pressure/suction sides of the impeller blades, and due to the turbulent nature of the flow as it travels downstream, especially after the bend area of the impeller. This may set up a circumferentially varying pattern of flow distortion that may degrade performance of both upstream impeller and downstream diffuser, which is undesirable.

SUMMARY

There is accordingly provided a gas turbine engine for an aircraft, comprising: a centrifugal compressor including an impeller with impeller blades extending from a hub and a diffuser downstream of the impeller, the impeller mounted for rotation about a central longitudinal axis within an outer shroud, a main flow passage extending between the hub and the shroud to an impeller exit defined downstream of the impeller blades, and a cavity disposed adjacent the exit, the cavity communicating with the main flow passage via at least one aperture through a main flow passage wall from an impeller-side opening to a cavity-side opening, the impeller-side opening located radially outward from the impeller exit relative to the central longitudinal axis, and the cavity-side opening located closer to the central axis than the impeller-side opening.

There is also provided a gas turbine engine for an aircraft, comprising: a centrifugal compressor having a main flow passage defined therethrough, the centrifugal compressor including: an impeller with impeller blades extending from a hub, the impeller mounted for rotation about a central longitudinal axis within an outer shroud, the impeller having a shroud side facing the outer shroud and an axially opposed hub side, an impeller exit defined downstream of the impeller blades; a main flow passage wall located on the shroud side near the impeller exit, the main flow passage wall separating a cavity disposed on the shroud side from the main flow passage; and one or more apertures defined through the main flow passage wall and extending along a respective aperture axis between the cavity and the main flow passage, the one or more apertures having a respective main flow passage side opening located radially outward from the impeller exit relative to the central longitudinal axis, the aperture axis disposed at a radial angle relative to the central longitudinal axis when viewed in a meridional plane of the centrifugal compressor.

There is also provided a method for operating a centrifugal compressor of a gas turbine engine, the centrifugal compressor having a main flow passage defined therethrough and an impeller mounted for rotation within an outer shroud about a central longitudinal axis, the method comprising: providing bidirectional flow communication between a cavity located on a shroud side of the impeller, on one side of a main flow passage wall, the main flow passage wall separating the cavity from the main flow passage and located adjacent an impeller exit, wherein bidirectional flow communication is provided via one or more apertures defined through the main flow passage wall and extending along a respective aperture axis between the cavity and the main flow passage, the one or more apertures having a respective main flow passage side opening located radially outward relative to the impeller exit relative to the central longitudinal axis, the aperture axes disposed at a radial angle relative to the central longitudinal axis when viewed in a meridional plane of the centrifugal compressor.

BRIEF DESCRIPTION OF THE DRAWINGS

Reference is now made to the accompanying figures in which:

FIG. 2 is a schematic cross-sectional partial view of a centrifugal compressor with an impeller, as used in the gas turbine engine shown in FIG. 1, taken along a meridional plane of the centrifugal compressor;

DETAILED DESCRIPTION

Figure 1:
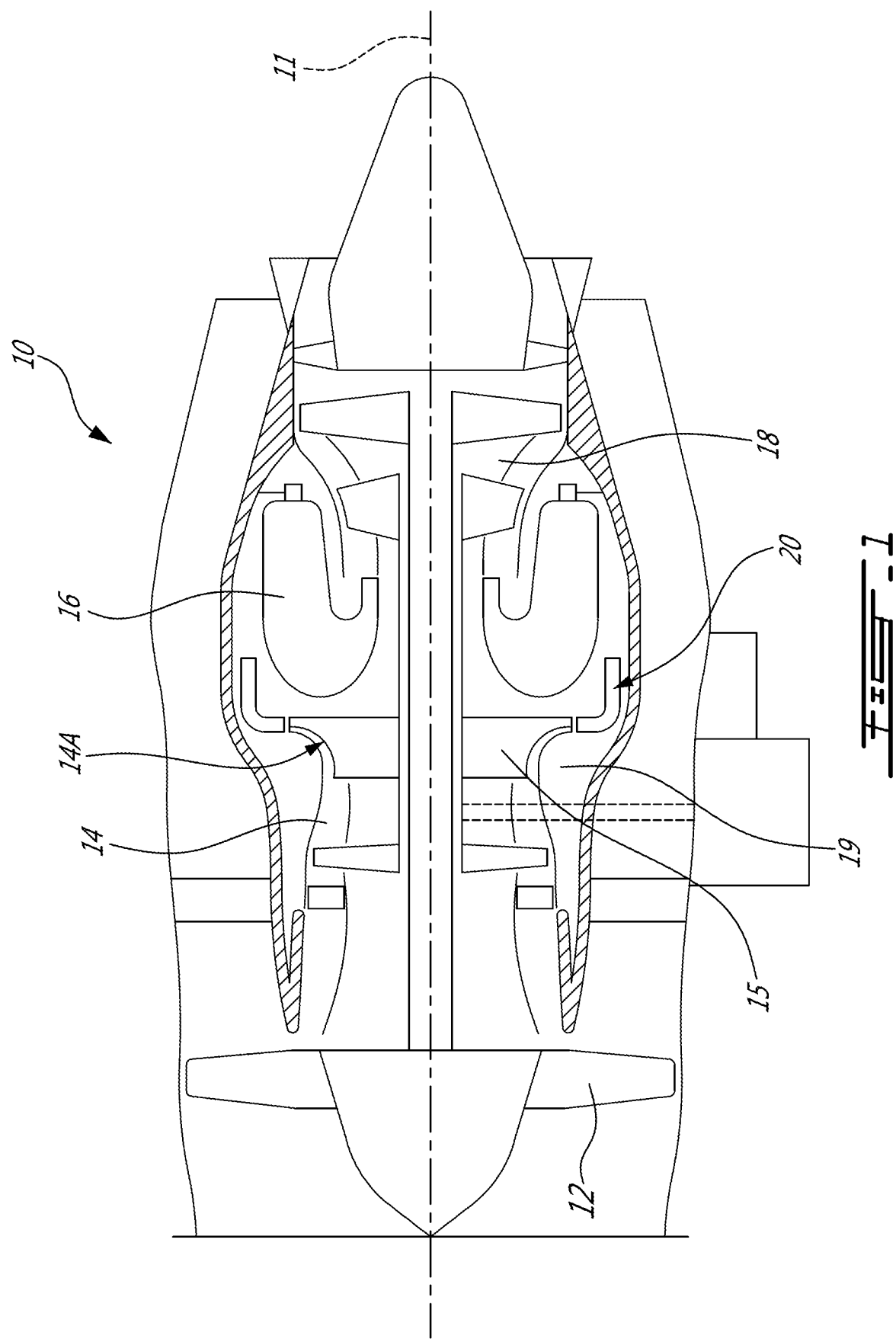
FIG. 1 is a schematic cross-sectional view of a gas turbine engine.

FIG. 1 illustrates an exemplary gas turbine engine 10 of a type preferably provided for use in subsonic flight. The exemplary gas turbine engine 10 as shown is a turbofan, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Also shown is a central longitudinal axis 11 of the engine 10. Even though the following description and accompanying drawings specifically refer to a turbofan engine as an example, it is understood that aspects of the present disclosure may be equally applicable to other types of combustion engines in general, and other types of gas turbine engines in particularly, including but not limited to turboshaft and turboprop turbine engines, auxiliary power units (APU), and the like.

The compressor section 14 of the engine 10 includes one or more compressor stages, at least one of which includes a centrifugal compressor 14A. The centrifugal compressor 14A have a main flow passage defined therethrough and includes a rotating impeller 15 and a downstream diffuser 20. The impeller 15 is mounted for rotation within an outer shroud 19 about the central longitudinal axis 11. The impeller 15 may draw air axially, and rotation of the impeller 15 may increase the velocity and build pressure within a main gas flow as the main gas flow is directed though the diffuser 20, to flow out in a radially outward direction under centrifugal forces.

Referring to FIG. 2, the diffuser 20 is positioned immediately downstream of the exit of a rotating component of the compressor, which in the exemplary embodiment is the impeller 15. The diffuser 20 may form a fluid connection between the impeller 15 and the combustor 16, thereby allowing the impeller 15 to be in serial flow communication with the combustor 16. The diffuser 20 may redirect the radial flow of the main gas flow exiting the impeller 15 to an annular axial flow for presentation to the combustor 16. In some embodiments of the gas turbine engine 10, the diffuser 20 may include vanes (not shown) downstream of the impeller exit by which the radial flow leaving the impeller 15 may exit the diffuser 20 and be led toward the next compressor stage or to the combustor 16. In other embodiments of the gas turbine engine 10, the diffuser may include one or more fishtail diffuser pipes directing the flow downstream of the impeller 15 to exit the diffuser 20. The diffuser 20, with or without vanes, may also reduce the velocity and increase the static pressure of the main gas flow when it is directed therethrough.

With continued reference to FIG. 2, the diffuser 20 includes an annular diffuser body 22 mounted about the impeller 15. The diffuser body 22 forms the corpus of the diffuser 20 and provides the structural support required to resist the loads generated during operation of the centrifugal compressor 14A. In some embodiments, such as the one depicted, the diffuser body 22 forms an annular diffuser ring extending circumferentially about the impeller exit 15B, and may have a vaned, vane-less, or semi-vaned space. The diffuser body 22 is mounted about a circumference of the compressor or impeller exit 15B so as to receive the main gas flow therefrom.

As shown, the impeller 15 includes impeller blades 15A extending from an impeller hub and having an axial bend extending radially outwardly with respect to the central longitudinal axis 11, which allow the axial main gas flow upstream of the impeller 15 to be directed radially outwardly away from the central longitudinal axis 11. The impeller 15 defines a shroud side, which corresponds to a region of the impeller 15 circumferentially surrounding the impeller blades 15A, and an opposed hub side, which is located downstream of the impeller 15, at the impeller back plate side. For sake of clarity, the reader is referred to FIG. 2, which shows a shroud side and an opposed hub side, respectively shown on the left side and right side of the illustrated example of centrifugal compressor 14A.

The impeller blades 15A each have a pressure side and a suction side, named as such with reference to the pressure differential between the gas flow pressure to the fore of the blades 15A versus the aft of the blades 15A caused by rotation of the impeller 15 and fluid interaction with the main gas flow. This may set up a circumferentially varying pattern of flow distortion at the impeller exit 15B, which is defined downstream of the impeller blades 15A, in other words at the exducer of the impeller 15 adjacent the tip of the impeller 15, or more specifically the tip of the blades 15A of the impeller 15. A pressure differential may occur between the pressure side and the suction side of the impeller blades 15A. As such, the pressure at impeller exit 15B may vary circumferentially due to a pressure difference between the pressure side and the suction side of the impeller blades 15A during rotation. This may create flow turbulence of the main gas flow travelling through the impeller 15, which may build along the impeller blades 15A, and more particularly after the bend area 15C of the blades 15A. This flow distortion may degrade performance of the gas turbine engine 10 as a whole and/or more specifically upstream of the impeller 15 and downstream of the diffuser 20.

Figure 3A:
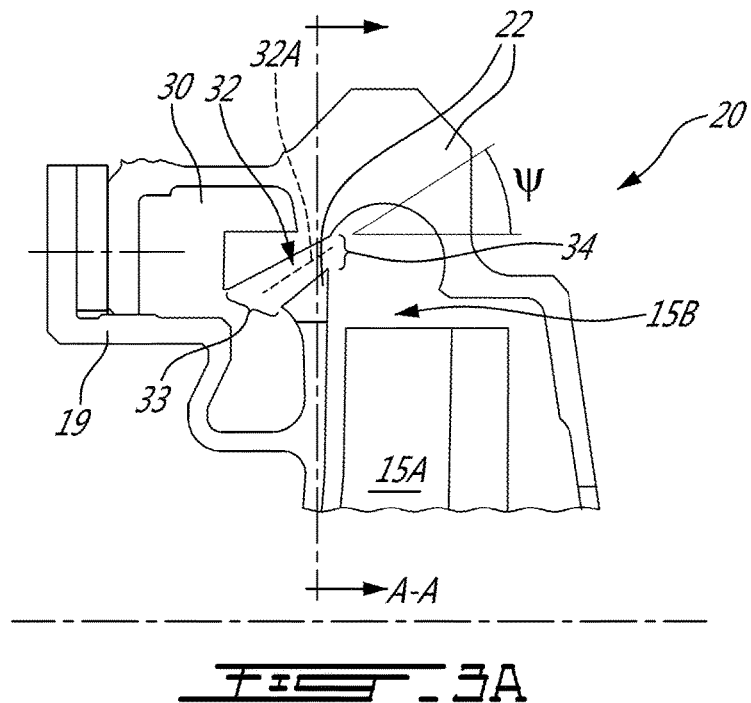
FIGS. 3A-3B are schematic cross-sectional partial views of an impeller, a centrifugal compressor with an impeller, such as shown in FIG. 2.
Figure 3B:
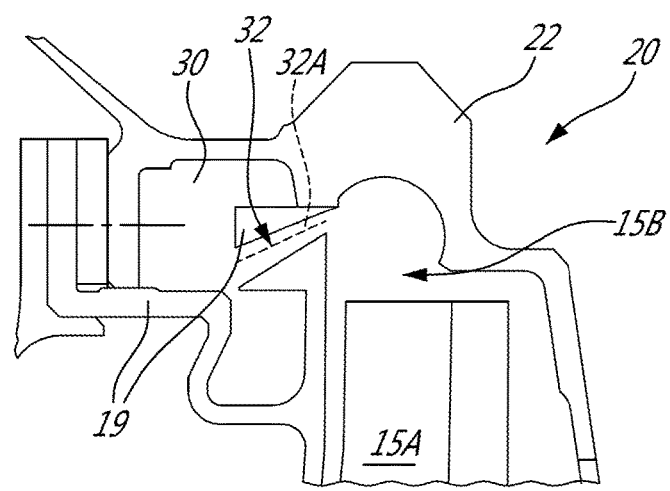

In an embodiment, such as shown in FIGS. 2 and 3A-3B for example, a cavity 30 is disposed on the shroud side of the impeller 15, on one side of a main flow passage wall separating the main flow passage from the cavity 30, where the main flow passage wall is located adjacent the impeller exit 15B. In an embodiment, where the diffuser body 22 forms an annular ring, the cavity 30 may be circumscribed by the annular ring and an adjacent portion of the outer shroud 19. In an embodiment, such as shown at least in FIG. 2, the diffuser body 22 defines a radially outward peripheral wall of the cavity 30, and the outer shroud 19 defines a radially inward peripheral wall of the cavity 30. In other embodiments, the cavity 30 may be an internal cavity defined solely in the diffuser body 22 and/or in the outer shroud 19. The cavity 30 may have any suitable internal volume and/or shape.

The cavity 30 is in fluid communication with the main flow passage exiting the impeller 15, in other words at the impeller exit 15B, via at least one (i.e. one or more) apertures 32, as will be seen. Flow enters and exits the cavity 30 via the same flow passage(s) defined through the one or more apertures 32, which in the present embodiment comprise a series of apertures 32 defined through the main flow passage wall and extending between the cavity and the main flow passage. In the depicted embodiment, the cavity 30 is an annular chamber that is closed but for the apertures 32, such that the apertures 32 provide the sole fluid connection to the closed chamber. This may be different in other embodiments, where, for instance, the cavity 30 may be in fluid communication with other parts of the engine 10 as well, via bleed off-take(s), if desirable.

In an embodiment, the apertures 32 are circumferentially equally spaced apart about the impeller 15. This may be different in other embodiments, where, for instance, the apertures 32 may be unevenly distributed along the circumference of the impeller 15. In an embodiment, the centrifugal compressor 14A includes a number of apertures 32 at least more than half the number of impeller blades 15A (rounded up), including the blades 15A within an exducer portion and extending to the impeller exit 15B. This may balance the flow exchange between the cavity 30 and the main flow passage between the suction side of a blade 15A and the opposite pressure side of an adjacent one of the blades 15A over the circumference of the impeller 15.

In an embodiment, such as shown in FIG. 2, the series of apertures 32 are defined at an interface between the outer shroud 19 and the diffuser body 22. In other words, the outer shroud 19 and the diffuser body 22 mate at a common edge, where they contact each other between circumferentially adjacent apertures 32. At such interface between the diffuser body 22 and the outer shroud 19, the common edge of the outer shroud 19 and the diffuser body 22 form respective radially inward and radially outward wall of the apertures 32. In other embodiments, such as shown in FIG. 3A, the series of apertures 32 are defined through a portion of the diffuser body 22, and provide fluid communication between the main flow passage at the impeller exit 15B and the cavity 30. In such case, the main flow passage wall through which the apertures 32 are defined is part of the diffuser body 22. In other embodiments, such as shown in FIG. 3B, the series of apertures 32 are defined through a portion of the outer shroud 19. In such case, the main flow passage wall through which the apertures 32 are defined is part of the outer shroud 19. This may depend on the location of the cavity 30 (within the shroud 19 or within the diffuser body 22).

The apertures 32 are located downstream of the impeller 15, adjacent the impeller exit 15B. The apertures 32 allow bidirectional flow communication between the cavity 30 and the main flow passage at the tip of the impeller blades 15A. In other words, flow may enter and exit the cavity via the apertures 32 in an alternating sequence as the impeller 15 rotates. More particularly, as the impeller 15 rotates, a portion of the fluid of the main flow passage at the impeller exit 15B enters the cavity 30 and reduces in velocity. The pressure field inside the cavity 30 may thus be different than that of the flow just outside the cavity 30. This pressure difference drives the flow in and out the cavity 30. During rotation of the impeller 15, there are flow separation regions at the impeller exit 15B that can occur, which may be caused by the pressure differential from the suction side to the pressure side of the blades 15A. These flow separation regions have low pressure and rotate around with the impeller 15. When they encounter higher pressure from inside the cavity 30, fluid inside the cavity 30 flows out from the cavity 30, which helps to rebalance the pressure in and/or "reenergize" these low pressure flow regions. Then, as fluid leaves the cavity 30 through the apertures 32, the flow pressure inside the cavity 30 will drop, which will result in having a higher pressure flow in the main flow passage from outside the cavity 30 to re-enter the cavity 30. This bidirectional flow cycle entering and leaving the cavity 30 may thus continue so long as the impeller 15 rotates and generate sufficient pressure differential between the pressure side and suction side of the blades 15A to provide such flow distortion. Thus, a constant momentum exchange between the fluid inside the cavity 30 and the main flow passage occurs during operation. In some embodiments, as these regions of flow separation reenergized via the fluid from the cavity 30 are sucked out from the cavity 30 through the apertures 32, the flow condition into the diffuser 20 downstream the impeller exit 15B has a more uniform flow stream. Circumferential/axial flow distortions originating from the impeller 15 is therefore damped before flowing through the diffuser 20.

In operation, the centrifugal compressor 14A of the gas turbine engine 10, which has the impeller 15 that rotates within the outer shroud 19 about the longitudinal axis 11, has a bidirectional flow communication provided between the cavity 30 located on a shroud side of the impeller 15 and a main flow passage at the impeller exit 15B via the series of apertures 32 extending between the cavity 30 and the main flow passage at the impeller exit 15B. Referring to FIG. 3A, in an embodiment, the apertures 32 have their aperture axis 32A at a radial angle when viewed in a meridional plane of the centrifugal compressor 14A relative to the central longitudinal axis 11. As such, the fluid flowing out from the cavity 30 via the apertures 32 may have a radial component relative to the main flow passage, which may reduce flow mixing losses and help reducing the flow distortion downstream of the impeller exit 15B, as discussed above. More particularly, in an embodiment, the apertures 32 have a cavity-side opening 33 and a main flow passage side opening 34 (also referred to herein as an "impeller-side opening" 34), and the aperture axes 32A are radially inwardly angled with respect to the central longitudinal axis 11 in a direction extending from the main flow passage side opening 34 to the cavity side opening 33. As such, when viewed in a meridional plane, such as shown in FIG. 3A, the cavity side opening 33 is disposed radially inward relative to the main flow passage side opening 34. Additionally, the impeller-side opening 34 is located radially outward from the impeller exit 15B, relative to the longitudinal central axis 11. The cavity-side opening 33, which is disposed radially inward from the impeller-side opening 34, is therefore located closer to the central axis 11 than the impeller-side opening 34.

In other embodiments, the aperture axes 32A may be radially outwardly angled with respect to the central longitudinal axis 11, such that the main flow passage side opening 34 may be radially outward relative to the cavity side opening 33. In the depicted embodiments, the main flow passage side opening 34 is located radially outward relative to the impeller exit 15B. The cavity side opening 33 may also be located radially outward relative to the impeller exit 15B, such as in the depicted embodiments, or in alternate embodiments, the cavity side opening 33 may be located radially inward relative to the impeller exit 15B. In an embodiment, the radial angle Ψ of the aperture axes 32A with respect to the central longitudinal axis 11 is $-80° \leq \Psi < 0°$ or $0° < \Psi \leq 80°$. More particularly, in one embodiment, the radial angle Ψ is $-80° \leq \Psi < -40°$ or $40° < \Psi \leq 80°$, and in another embodiment the radial angle Ψ is $-70° \leq \Psi < -50°$ or $50° < \Psi \leq 70°$. In a further particular embodiment, the radial angle Ψ is $45° \pm 10°$. The radial angle Ψ may be different in other embodiments, but still excluding about 0° (i.e. $0° \pm 5°$). While all the apertures 32 have their aperture axis 32A uniformly radially angled with respect to the central longitudinal axis 11 in an embodiment, one or more apertures 32 may be radially angled differently from one or more other apertures 32, in some embodiments.

Figure 4:
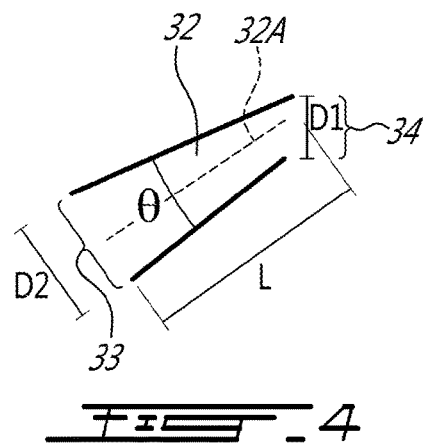
FIG. 4 is an enlarged schematic cross-sectional view of one of the aperture between a cavity and a main flow passage, taken along a meridional plane of the centrifugal compressor, such as shown in FIGS. 2, 3A and 3B.

In an embodiment, the apertures 32 are tapered in a direction extending from the cavity 30 toward the main flow passage. In other words, a cross-sectional area of the cavity side opening 33 may be larger than a cross-sectional area of the main flow passage opening 34, whereby fluid exiting the main flow passage to enter the cavity 30 through the apertures 32 may pass in a divergent passage defined by the apertures 32 to reach the cavity 30. Conversely, fluid exiting the cavity 30 to re-enter the main flow passage may pass in a convergent passage defined by the apertures 32. This may provide optimal swirl to the downstream diffuser 20 and/or provide better vortical structure which may increase mixing of the fluid exiting the cavity 30 with the fluid of the main flow passage at the impeller exit 15B. In other embodiments, the apertures 32 may be tapered in the opposite direction, if desirable. In a particular embodiment, the apertures 32 may have a convergent-divergent shape, such that the apertures 32 may have a choked cross-section, i.e. a cross-sectional area, between the cavity side opening 33 and the main flow passage side opening 34, that is smaller than the cavity side opening 33 and/or the main flow passage side opening 34. Referring to FIG. 4, the apertures 32 have a conical shape, which may diverge or converge toward the cavity side opening 33, depending on the embodiment. For instance, in an embodiment, the apertures 32 have a conical angle θ that is $-20° \leq \theta < 0°$ or $0° < \theta \leq 20°$. In a particular embodiment, the conical angle θ is $10° \pm 5°$. The conical angle θ may be different in other embodiments. In some embodiments, the apertures 32 may thus be radially angled (i.e. radially inwardly or radially outwardly angled relative to the central longitudinal axis 11) and tapered toward the cavity side opening 33 or the main flow passage side opening 34. The apertures 32 may or may not be all equally tapered, depending on the embodiment.

The apertures may have many suitable cross-section shapes. In embodiments where the apertures 32 have a round shape (e.g. circular shape), a diameter D2 of the apertures 32 at the cavity side opening 33 may be greater than a diameter D1 of the apertures 32 at the main flow passage side opening 34, as shown in FIG. 4. In embodiments where the round shape is elongated, such as in an oval shape, these diameters D1 and D2 may be the measure of the maximum transversal dimension of the openings 33, 34. In other embodiments, the apertures 32 may have other shapes, such as a rectangular cross-sectional shape. In some embodiments, the apertures 32 have a constant cross-section shape, though the cross-section shape may vary from the cavity side opening 33 and the main flow passage side opening 34 in other embodiments. Also, while all the apertures 32 have a uniform cross-section shape in an embodiment, one or more apertures 32 may have different cross-section shapes than one or more other apertures 32, in some embodiments.

Figure 5:
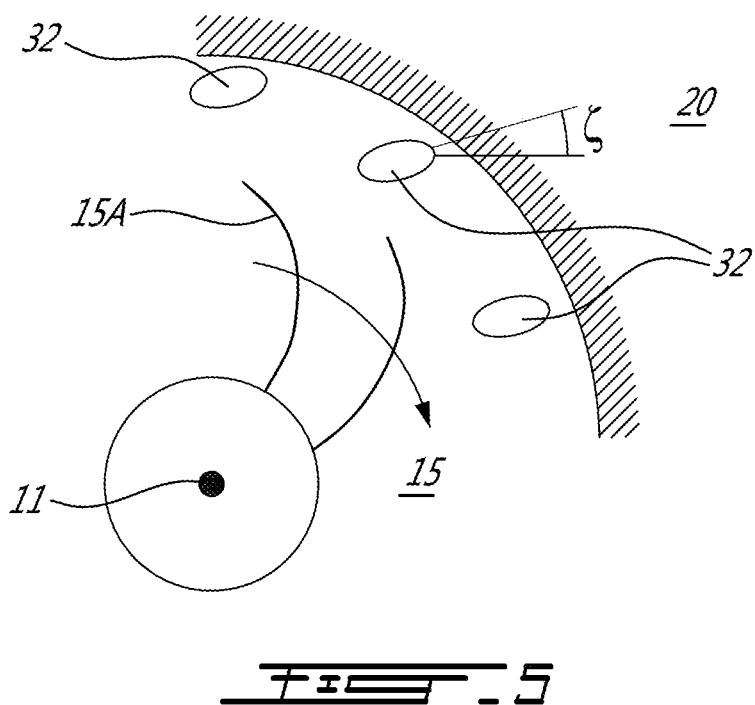
FIG. 5 is a schematic front elevation view of the centrifugal compressor with an impeller taken in a plane normal to a central longitudinal axis of the impeller of FIGS. 2, 3A and 3B, looking downstream.

In addition to being tapered and/or radially angled, the apertures 32 may be circumferentially angled relative to a plane normal to the central longitudinal axis 11. In other words, in some embodiments, the cavity side opening 33 and the main flow passage side opening 34 of the apertures 32 are circumferentially offset relative to each other. Such plane may correspond to the plane A-A shown in FIG. 3A taken transversally to the longitudinal axis 11. The circumferential angle ζ may also be defined as the angle relative to a line tangent to the impeller exit 15B radius (perpendicular to the central longitudinal axis 11). For instance, in an embodiment as shown in FIG. 5, a circumferential angle ζ of the aperture axes 32A relative to the plane normal to the central longitudinal axis 11 is $-80° \leq \zeta < 0°$ or $0° < \zeta \leq 80°$. More particularly, in an embodiment, the circumferential angle ζ is $-80° \leq \zeta < -40°$ or $40° < \zeta \leq 80°$, and in some cases the circumferential angle ζ is $-70° \leq \zeta < -50°$ or $50° < \zeta \leq 70°$. In a particular embodiment, the circumferential angle ζ is $45° \pm 10°$. The circumferential angle ζ may be different in other embodiments. While all the apertures 32 have their aperture axis 32A uniformly circumferentially angled relative to the plane normal to the central longitudinal axis 11 in an embodiment, one or more apertures 32 may be circumferentially angled differently from one or more other apertures 32, in some embodiments.

The apertures 32 have length L defined from the cavity side opening 33 to the main flow passage side opening 34 taken along the aperture axes 32A. In an embodiment, a ratio of the length L of the apertures 32 over the diameter D1 is ≥1. While all the apertures 32 have a uniform length L in an embodiment, one or more apertures 32 may have a greater length than one or more other apertures 32, in some embodiments.

Figure 6:
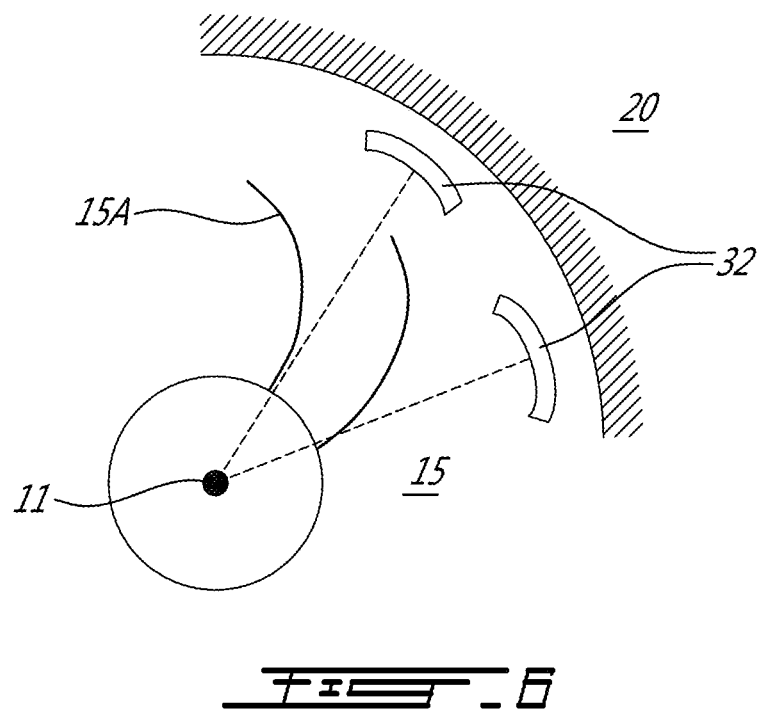
FIG. 6 is a schematic front elevation view of a variant of the centrifugal compressor with an impeller taken in a plane normal to a central longitudinal axis of the impeller of FIGS. 2, 3A and 3B, looking downstream.

Although described above as being apertures 32 with a rounded cross-section shape in some embodiments, with or without the tapering of the apertures 32, the series of apertures 32 may also take the form of a series of elongated slots. This is shown in FIG. 6, for instance. In an embodiment, such as shown, the elongated slots have an arcuate cross-section shape, though other cross-section shapes may be contemplated. The arcuate cross-section shaped slots have their radius oriented toward the central longitudinal axis 11, such as shown. The arcuate cross-section shape may also have their radius oriented differently, for instance away from the central longitudinal axis 11, in other embodiments.

Whether the series of apertures 32 are in the form of a series of elongated slots, or with other cross-section shapes, as discussed above, both arrangements may provide better alignment of the flow exiting the cavity 30 with the flow downstream of the impeller exit 15B and upstream the diffuser passages leading toward the combustor 16 or another compressor stage when compared with impeller 15 and diffuser 20 assembly(ies) with a single, non-angled, circumferential slot between the cavity 30 and the main flow passage downstream of the impeller 15, adjacent the tips of the impeller blades 15A, as may be provided in some cases, for instance. This may advantageously improve the cavity influence on downstream diffuser stall margin in some embodiments.

In an alternate embodiment, there only a single aperture 32 is provided in the form of an annular slot extending circumferentially about the impeller exit 15B, instead of having the series of apertures 32 described above. In such embodiment, the annular slot would be radially angled and the above description in this regard would also be applicable to this embodiment. The annular slot may also have other characteristics described above with respect to other embodiments, including the characteristics described with respect to the tapered shape of the apertures 32 and location of the apertures 32 within the centrifugal compressor 14A.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A gas turbine engine for an aircraft, comprising:
    a centrifugal compressor including an impeller with impeller blades extending from a hub and a diffuser downstream of the impeller, the impeller mounted for rotation about a central longitudinal axis within an outer shroud, a main flow passage extending between the hub and the shroud to an impeller exit defined downstream of the impeller blades, and a cavity disposed adjacent the impeller exit, the cavity communicating with the main flow passage via at least one aperture defining a flow passage through a main flow passage wall, the at least one aperture extending from an impeller-side opening to a cavity-side opening, the impeller-side opening located upstream of the diffuser, radially outward from the impeller exit relative to the central longitudinal axis such that part of a main gas flow of the main flow passage is in bidirectional fluid exchange with the cavity before exiting through the diffuser, the at least one aperture extending along an aperture axis between the impeller-side opening and the cavity-side opening, the cavity-side opening located closer to the central axis than the impeller-side opening and the aperture axis disposed at a radial angle relative to the central longitudinal axis when viewed in a meridional plane of the centrifugal compressor, the at least one aperture tapered in a direction extending from the cavity-side opening toward the impeller-side opening.

2. The gas turbine engine as defined in claim 1, wherein the cavity defines a closed chamber, the at least one aperture providing a sole fluid connection to the closed chamber.

3. The gas turbine engine as defined in claim 1, wherein the diffuser includes an annular ring extending circumferentially about the impeller exit and radially outward relative the impeller exit, the cavity circumscribed by the annular ring and a portion of the outer shroud.

4. The gas turbine engine as defined in claim 1, wherein the main flow passage wall is part of the outer shroud.

5. The gas turbine engine as defined in claim 1, wherein the radial angle ($\Psi$) of the aperture axis with respect to the central longitudinal axis is $-80°\leq\Psi<0°$ or $0°<\Psi\leq80°$.

6. The gas turbine engine as defined in claim 1, wherein the at least one aperture has a length defined from the cavity-side opening to the impeller-side opening, the length greater than a maximal transversal dimension of the impeller-side opening.

7. The gas turbine engine as defined in claim 1, wherein the at least one aperture has a conical shape defining a conical angle $\theta$, wherein the conical angle $\theta$ is $-20°\leq\theta<0°$ or $0°<\theta\leq20°$.

8. The gas turbine engine as defined in claim 1, wherein the impeller includes a number of exducer-blades extending circumferentially about the impeller, the centrifugal compressor having a number of the at least one aperture, the number being at least more than half the number of exducer-blades.

9. The gas turbine engine as defined in claim 1, wherein a diameter of the cavity-side opening is greater than a diameter of the impeller-side opening.

10. The gas turbine engine as defined in claim 1, wherein the diffuser includes an annular ring extending circumferentially about the impeller exit and radially outward relative to the impeller exit to receive a main gas flow from within the impeller exit, the at least one aperture defined at an interface between the outer shroud and the annular ring, the outer shroud forming a radially inward wall of the at least one aperture and the annular ring forming a radially outward wall of the at least one aperture.

11. A gas turbine engine for an aircraft, comprising:
a diffuser having a annular diffuser body;
a centrifugal compressor having a main flow passage defined therethrough, the main flow passage upstream of the annular diffuser body to discharge a main gas flow from the centrifugal compressor through passages within the annular diffuser body, the centrifugal compressor including:
an impeller with impeller blades extending from a hub, the impeller mounted for rotation about a central longitudinal axis within an outer shroud, the impeller having a shroud side facing the outer shroud and an axially opposed hub side, an impeller exit defined downstream of the impeller blades;
a main flow passage wall located on the shroud side near the impeller exit, the main flow passage wall separating a cavity disposed on the shroud side from the main flow passage; and
one or more apertures defined through the main flow passage wall and extending along a respective aperture axis between the cavity and the main flow passage, the one or more apertures having a respective main flow passage side opening located radially outward from the impeller exit relative to the central longitudinal axis, the main flow passage side opening located upstream of the annular diffuser body, each said aperture axis disposed at a radial angle relative to the central longitudinal axis when viewed in a meridional plane of the centrifugal compressor, the one or more apertures tapered in a direction extending from the cavity to the main flow passage side opening.

12. The gas turbine engine as defined in claim 11, wherein the cavity defines a closed chamber, the one or more apertures providing a sole fluid connection to the closed chamber.

13. The gas turbine engine as defined in claim 11, wherein the one or more apertures are tapered in a direction extending from the cavity toward the main flow passage, such that a diameter of the one or more apertures at a cavity side opening is greater than a diameter of the one or more apertures at the main flow passage side opening.

14. The gas turbine engine as defined in claim 11, wherein the radial angle $\Psi$ of the aperture axes with respect to the central longitudinal axis is $-80°\leq\Psi<0°$ or $0°<\Psi\leq80°$.

15. The gas turbine engine as defined in claim 11, wherein a circumferential angle $\zeta$ of the aperture axes relative to a plane normal to the central longitudinal axis is $-80°\leq\zeta<0°$ or $0°<\zeta\leq80°$.

16. The gas turbine engine as defined in claim 11, wherein the one or more apertures have a respective length defined from a cavity side opening to their main flow passage side opening taken along the aperture axes, the length greater than a respective diameter of the one or more apertures.

17. The gas turbine engine as defined in claim 11, wherein the one or more apertures have a conical shape having a conical angle $\theta$, wherein the conical angle $\theta$ is $-20°\leq\theta<0°$ or $0°<\theta\leq20°$.

18. The gas turbine engine as defined in claim 11, wherein the main flow passage wall is part of the outer shroud.

19. The gas turbine engine as defined in claim 11, wherein the annular diffuser body defines an annular ring extending circumferentially about the impeller exit and radially outward relative the impeller exit, the cavity circumscribed by the annular ring and a portion of the outer shroud.

20. The gas turbine engine as defined in claim 11, wherein the annular diffuser body defines an annular ring extending circumferentially about the impeller exit and radially outward relative to the impeller exit to receive a main gas flow from within the impeller exit, the one or more apertures defined at an interface between the outer shroud and the annular ring, the outer shroud forming a radially inward wall of the one or more apertures and the annular ring forming a radially outward wall of one or more apertures.

21. A method for operating a centrifugal compressor of a gas turbine engine, the centrifugal compressor having a main flow passage defined therethrough and an impeller mounted for rotation within an outer shroud about a central longitudinal axis, the gas turbine engine having a diffuser downstream of the centrifugal compressor to receive a main gas flow therefrom, the method comprising:
providing bidirectional flow communication upstream of the diffuser between a cavity located on a shroud side of the impeller and the main gas flow, on one side of a main flow passage wall, the main flow passage wall separating the cavity from the main flow passage and located adjacent an impeller exit, wherein bidirectional flow communication is provided via one or more apertures defined through the main flow passage wall and extending along a respective aperture axis between the cavity and the main flow passage, the one or more apertures having a respective main flow passage side opening located radially outward relative to the impeller exit relative to the central longitudinal axis, the respective main flow passage side opening located upstream of the diffuser, the aperture axes disposed at a radial angle relative to the central longitudinal axis when viewed in a meridional plane of the centrifugal compressor, the one or more apertures tapered in a direction extending from the cavity to the main flow passage side opening.

* * * * *